(12) United States Patent
Huebner

(10) Patent No.: US 6,227,238 B1
(45) Date of Patent: May 8, 2001

(54) VALVE PROVIDING PRESSURE DIFFERENTIAL PROPORTIONAL TO DOWNSTREAM PRESSURE

(75) Inventor: Robert J. Huebner, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/337,593

(22) Filed: Jun. 21, 1999

(51) Int. Cl.$^7$ ................................................ G05D 16/10
(52) U.S. Cl. ................ 137/505.13; 137/505; 137/505.15
(58) Field of Search ............................ 137/505, 505.13, 137/505.15, 501, 503

(56) References Cited

U.S. PATENT DOCUMENTS

| | | | |
|---|---|---|---|
| 3,517,681 | 6/1970 | Davison | 137/505.18 |
| 3,583,422 * | 6/1971 | Dach et al. | 137/505.15 X |
| 3,756,558 | 9/1973 | Okui | 251/282 |
| 4,009,864 | 3/1977 | Schexnayder | 251/282 |
| 4,114,857 | 9/1978 | Bondi | 251/324 |
| 4,362,089 | 12/1982 | Melocik et al. | 91/461 |
| 4,422,470 * | 12/1983 | Jackson et al. | 137/484.2 |
| 4,478,237 | 10/1984 | Blake et al. | 137/116.3 |
| 4,557,294 | 12/1985 | Brunner | 137/625.68 |
| 4,732,190 * | 3/1988 | Polselli | 137/460 |
| 4,750,511 | 6/1988 | Henry et al. | 137/14 |
| 4,751,866 | 6/1988 | Blake | 91/446 |
| 5,456,282 | 10/1995 | Whitehead et al. | 137/505.13 |
| 5,560,205 | 10/1996 | Huebner | 60/469 |
| 5,806,314 | 9/1998 | Younes | 60/547.1 |
| 5,868,166 | 2/1999 | Miller | 137/625.27 |
| 5,876,184 | 3/1999 | Marcott | 41/213 |

* cited by examiner

Primary Examiner—Stephen M. Hepperle
(74) Attorney, Agent, or Firm—Steve D. Lundquist

(57) ABSTRACT

An apparatus for providing a hydraulic pressure differential proportional to a downstream pressure. The apparatus includes a first chamber having a first cross section area, a main chamber portion, a first end, and a second end; a first spool portion located in the first chamber, the first spool portion having a first end and a second end, the first end of the first spool portion being located at the location of the downstream pressure; a second chamber having a second cross section area, a first end, and a second end; and a second spool portion located in the second chamber, the second spool portion having a first end and a second end, the first end of the second spool portion being located generally adjacent the second end of the first spool portion and the second end of the second spool portion being located at the location of the upstream pressure.

10 Claims, 1 Drawing Sheet

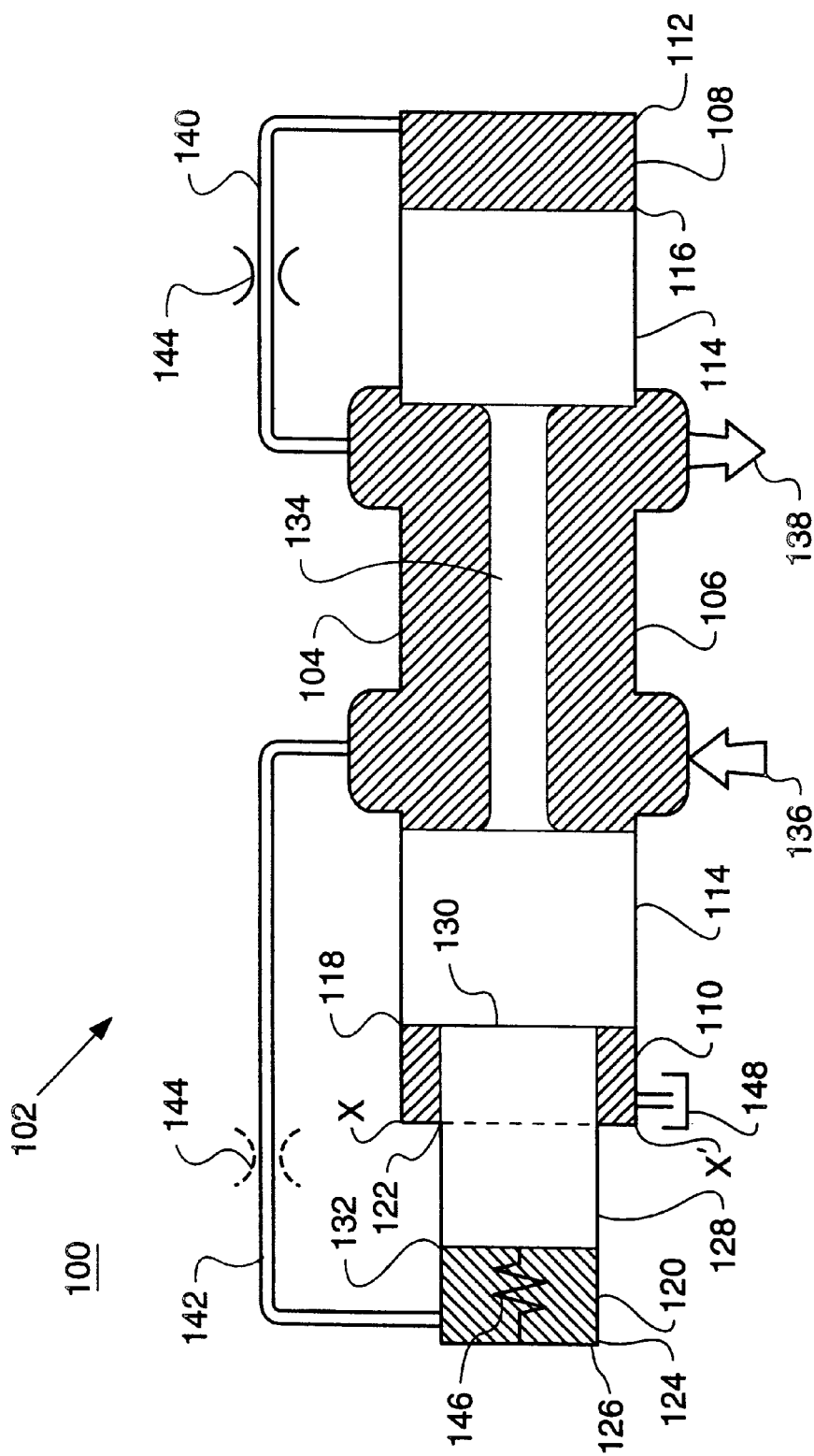

VALVE PROVIDING PRESSURE DIFFERENTIAL PROPORTIONAL TO DOWNSTREAM PRESSURE

TECHNICAL FIELD

This invention relates generally to a valve for providing hydraulic pressure differential between upstream and downstream pressures and, more particularly, to a valve for providing hydraulic pressure differential proportional to the downstream pressure.

BACKGROUND ART

Hydraulic machines, for example hydraulic earthworking machines such as loaders, dozers, graders, and the like, are commonly used to perform work operations which require large amounts of power. The characteristics of hydraulic systems provide the power needed for the machines to function productively and efficiently.

However, there are characteristics of hydraulic systems which are not desired. For example, flow ripple caused by the geometry, port timing, and speed of hydraulic pumps and motors creates pressure waves which in turn generate noise in the systems. This noise can be a distraction and a nuisance to an operator responsible for controlling the machine for long periods of time.

Historically, attempts have been made to reduce the amount of noise by enclosing hydraulic systems in acoustic enclosures. However, this leads to extra expense in designing and building the hydraulic machine, and makes routine maintenance more difficult. In addition, it is not feasible to enclose the entire hydraulic system, since the hydraulics of a machine are generally disposed throughout the machine. Furthermore, acoustic enclosures can only muffle the noise and do nothing to reduce the noise itself.

In commonly-owned U.S. Pat. No. 5,560,205, Huebner discloses a system which uses a fluid vessel having a volumetric space of a predetermined size located in the hydraulic system generally adjacent a pump, and a flow restrictor located in the system downstream of the fluid vessel. The flow restrictor, preferably, is variable to provide fluid noise reduction over a wide range of pressures and flow rates, and is externally controlled. However, an externally controlled, variable area flow restrictor can add significant cost and complexity to a hydraulic system, and therefore may not always be the desired solution for hydraulic noise problems.

It is known in the art to use pressure reducing valves for various reasons. In addition, pressure reducing valves, by nature of their ability to reduce pressure in a hydraulic system, are also known to reduce hydraulic noise caused by flow ripple. However, pressure reducing valves are typically used for applications such as pressure regulating, fixed pressure reduction, and the like. A pressure reducing valve used specifically for hydraulic fluid noise reduction would preferably result in the input pressure being a desired small percentage higher than the output pressure. The valve would maintain the same percentage difference for all pressures and flow rates. In addition, a pressure reducing valve for the express purpose of fluid noise reduction would preferably be of relatively simple design and be economical.

The present invention is directed to overcoming one or more of the problems as set forth above.

DISCLOSURE OF THE INVENTION

In one aspect of the present invention an apparatus for providing a hydraulic pressure differential proportional to a downstream pressure is provided. The apparatus includes a first chamber having a first cross section area, a main chamber portion, a first end, and a second end; a first spool portion located in the first chamber, the first spool portion having a first end and a second end, the first end of the first spool portion being located at the location of the downstream pressure; a second chamber having a second cross section area, a first end, and a second end; and a second spool portion located in the second chamber, the second spool portion having a first end and a second end, the first end of the second spool portion being located generally adjacent the second end of the first spool portion and the second end of the second spool portion being located at the location of the upstream pressure.

BRIEF DESCRIPTION OF THE DRAWINGS

FIG. 1 is a diagrammatic illustration of a preferred embodiment of an apparatus of the present invention.

BEST MODE FOR CARRYING OUT THE INVENTION

Referring to FIG. 1, the present invention is an apparatus 100 for providing a hydraulic pressure differential proportional to a downstream pressure. Preferably, the apparatus 100 depicted in FIG. 1 is a hydraulic valve 102, i.e., a spool valve. It is noted that FIG. 1 is a diagrammatic illustration and is not drawn to any scale.

The valve 102 includes a first chamber 104 having a first cross section area. The first chamber 104 includes a main chamber portion 106. When the valve 102 is in an open position, hydraulic fluid is allowed to flow into the main chamber portion 106 through a hydraulic inlet port 136, and is allowed to flow out of the main chamber portion 106 through a hydraulic outlet port 138. The first chamber 104 also has a first end 108 which is at a location of downstream pressure 112.

Located within the first chamber 104 is a first spool portion 114. The first spool portion 114 has a cross section area generally equivalent to the first cross section area of the first chamber 104, thus providing a sealed fit within the first chamber 104. The first spool portion 114 is movable with respect to the first chamber 104 to selectively vary the area of the flow passage between the inlet port 136 and outlet port 138. Preferably, the first spool portion 114 is adapted to move to a position which can block the outlet port 138, thus stopping the flow of hydraulic fluid through the valve 102. Alternatively, the first spool portion 114 is adapted to move to a position which does not block either the inlet port 136 or the outlet port 138, thus allowing the flow of hydraulic fluid through the valve 102.

The first spool portion 114 has a first end 116 located at the location of the downstream pressure 112, i.e., at the first end 108 of the first chamber 104. The first spool portion 114 also has a second end 118, which is located at a second end 110 of the first chamber 104. The second end 118 of the first spool portion 114 and the second end 110 of the first chamber 104 are discussed in more detail below. In addition, the first spool portion 114 has a center portion 134 which has a cross section area smaller in value than the cross section area of the first and second ends 116,118 of the first spool portion 114.

A second chamber 120, which has a second cross section area, has a first end 122 which is located at the second end 110 of the first chamber 104. The second chamber 120 has a second end 124 which is at a location of upstream pressure 126. Preferably, the cross section area of the second chamber 120 is smaller than the cross section area of the first chamber 104.

A second spool portion 128 is located in the second chamber 120. The second spool portion 128 has a cross section area generally equivalent to the cross section area of the second chamber 120, thus providing a sealed fit within the second chamber 120. The second spool portion 128 has a first end 130 located generally adjacent the second end 118 of the first spool portion 114. In the preferred embodiment, the second spool portion 128 is not attached to the first spool portion 114, but moves with the movement of the first spool portion 114. More specifically, as the first spool portion 114 moves, the second spool portion 128 also moves so that the first end 130 of the second spool portion 128 maintains contact with the second end 118 of the first spool portion 114.

The second spool portion 128 also has a second end 132 which is located at the location of the upstream pressure 126, i.e., at the second end 124 of the second chamber 120.

In the preferred embodiment, the cross section area of the second spool portion 128 is smaller than the cross section area of the first spool portion 114, just as the cross section area of the second chamber 120 is smaller than the cross section area of the first chamber 104.

In one embodiment of the present invention, the second chamber 120 is attached to the first chamber 104 in a fixed manner, e.g., by permanently attaching the second chamber 120 to the first chamber 104 during initial construction. However, in an alternate embodiment, the second chamber 120 is removably attached to the first chamber 104, for example, by machined screw threads along axis X–X' and the optional use of o-ring seals (not shown). In this alternate embodiment, the second chamber 120 and the second spool portion 128 may be removed for replacement by a second chamber 120 and second spool portion 128 having a different cross section area. This interchangeability allows selection of a valve 102 having varying characteristics in accordance with the purpose of the present invention, as discussed below.

A first pilot line 140 connects from the outlet port 138 to the location of downstream pressure 112 in the first chamber 104. A second pilot line 142 connects from the inlet port 136 to the location of upstream pressure 126 in the second chamber 120. The first and second pilot lines 140,142 provide pressurized hydraulic fluid to the locations of downstream and upstream pressure 112,126, respectively.

In the preferred embodiment, a damping orifice 144 is located in one of the first and second pilot lines 140,142. The damping orifice 144 slows the rate of flow of hydraulic fluid. For example, a damping orifice 144 located in the first pilot line 140 slows the rate of fluid flow into and out of the portion of the first chamber 104 at the location of downstream pressure 112. The reduced rate of flow damps the movement of the first spool portion 114, thus providing a smooth change in the flow resistance of the valve 102.

In one embodiment of the present invention, a spring 146 is located at the location of upstream pressure 126. The spring 146 is adapted to provide a spring force to the second end 132 of the second spool portion 128. Preferably, the spring 146 is a lightweight spring and provides a compression force to the second spool portion 128 to push the second spool portion 128 against the first spool portion 114 to keep the valve 102 open as desired. In another embodiment of the present invention, no spring is used.

In another preferred embodiment of the present invention, a drain to tank 148 is connected to the second end 110 of the first chamber 104. The drain to tank 148 provides a drain for hydraulic fluid which might leak into the second end 110 of the first chamber 104, thus preventing a pressure increase in the second end 110.

INDUSTRIAL APPLICABILITY

The present invention, as described above, provides a hydraulic pressure differential which is proportional to a downstream pressure. The pressure differential is preferably of a small value, e.g., 3% to 5%, and is used to reduce flow ripples in the hydraulic system, which in turn create fluid noise. However, it is noted that the pressure differential may be of a value greater than or less than the exemplary 3% to 5% for purposes of the present invention.

The reduction in pressure is achieved by use of a principle that the valve 102 is in balance when upstream pressure times the cross section area of the spool at the upstream end equals downstream pressure times the cross section area of the spool at the downstream end. With respect to the present invention:

$$P_{up}*(A_{spool2}) = P_{down}*(A_{spool1}) \quad \text{(Equation 1)}$$

where $P_{up}$ is the hydraulic pressure at the location of upstream pressure 126, $P_{down}$ is the hydraulic pressure at the location of downstream pressure 112, $A_{spool2}$ is the cross section area of the second spool portion 128, and $A_{spool1}$ is the cross section area of the first spool portion 114.

As an example of an application of the present invention, the first and second ends 116,118 of the first spool portion 114 has a cross section area of 1.05. The second spool portion 128 has a cross section area of 1.00. The units of measure of the cross section areas are not needed. Inserting these areas into Equation 1:

$$P_{up}*(1.00) = P_{down}*(1.05)$$

$$P_{up}/P_{down} = 1.05/1.00$$

$$P_{down} = 0.95*P_{up}$$

It is noted that the difference between upstream and downstream pressure is approximately 5% of the downstream pressure, and remains 5% for any downstream pressure. This 5% differential in pressure is achieved with a second spool portion 128 having a cross section area that is 1.05−1.00= 0.05 of a unit less than the cross section area of the first spool portion 114.

Other aspects, objects, and features of the present invention can be obtained from a study of the drawings, the disclosure, and the appended claims.

What is claimed is:

1. An apparatus for providing a hydraulic pressure differential proportional to a downstream pressure, comprising:

a first chamber having a first cross section area, a main chamber portion, a first end, and a second end, the first end of the first chamber being the location of the downstream pressure;

a first spool portion located in the first chamber and having a cross section area generally equivalent to the first cross section area of the first chamber, the first spool portion having a first end and a second end, the first end of the first spool portion being located at the location of the downstream pressure;

a second chamber having a second cross section area differing in value from the cross section area of the first chamber, a first end, and a second end, the first end of the second chamber being located at the second end of the first chamber, the second end of the second chamber being the location of an upstream pressure; and a second spool portion located in the second chamber and having a cross section area generally equivalent to the second cross section area of the second chamber, the second spool portion having a first end and a second end, the first end of the second spool portion being located generally adjacent the second end of the first spool portion and the second end of the second spool portion being located at the location of the upstream pressure.

2. An apparatus, as set forth in claim 1, wherein the first spool portion further includes a center portion having a cross section area smaller in value than the cross section area of the first and second ends of the first spool portion.

3. An apparatus, as set forth in claim 2, further comprising:

a hydraulic inlet port located in the main chamber portion of the first chamber; and a hydraulic outlet port located in the main chamber portion of the first chamber;

wherein the spool is movable with respect to the first chamber to selectively vary the resistance to flow of a hydraulic fluid between the inlet port and the outlet port.

4. An apparatus, as set forth in claim 3, further comprising:

a first pilot line from the outlet port to the location of the downstream pressure; and a second pilot line from the inlet port to the location of the upstream pressure.

5. An apparatus, as set forth in claim 4, further including a damping orifice located in one of the first and second pilot lines.

6. An apparatus, as set forth in claim 3, further including a spring located at the location of the upstream pressure and adapted to provide a spring force to the second end of the second spool portion.

7. An apparatus, as set forth in claim 6, wherein the spring force is a compression force.

8. An apparatus, as set forth in claim 3, wherein the cross section area of the second spool portion is smaller than the cross section area of the first spool portion by a predetermined value.

9. An apparatus, as set forth in claim 8, wherein the second chamber is removably attached to the first chamber.

10. An apparatus, as set forth in claim 3, further including a drain to tank connected to a portion of the first chamber located adjacent the second chamber.

* * * * *